United States Patent [19]

Hayama

[11] 4,207,385
[45] Jun. 10, 1980

[54] CLOSED TYPE ALKALINE STORAGE BATTERY

[75] Inventor: Hideki Hayama, Yokohama, Japan

[73] Assignee: Furukawa Denchi Kabushiki Kaisha, Yokohama, Japan

[21] Appl. No.: 15,749

[22] Filed: Feb. 27, 1979

[30] Foreign Application Priority Data

Mar. 4, 1978 [JP] Japan .................... 53-27908[U]

[51] Int. Cl.$^2$ ............................... H01M 2/12
[52] U.S. Cl. ............................................ 429/56
[58] Field of Search ................. 429/56, 94, 53, 54, 429/55

[56] References Cited

U.S. PATENT DOCUMENTS

| | | | |
|---|---|---|---|
| 3,214,300 | 10/1965 | Nordvik | 429/56 |
| 3,262,819 | 7/1966 | Belove | 429/56 |
| 3,556,863 | 1/1971 | Nathe | 429/55 |
| 3,909,303 | 9/1975 | Rosansky et al. | 429/56 |

Primary Examiner—Donald L. Walton
Attorney, Agent, or Firm—Haseltine, Lake & Waters

[57] ABSTRACT

The alkaline storage battery employs a metallic hat shaped terminal closure which has a piercing needle as well as a puncturable metallic diaphragm positioned below the piercing needle. The needle is fixed by caulking at its peripheral edge portion to a edge of the closure. A comparatively thick and hard metal plate is placed on the inner surface of the diaphragm and is applied to an open portion of a tubular metallic container which has a battery element. A peripheral edge portion of the closure, the diaphragm and the metallic plate are clamped in airtight relationship through a packing between the caulked end portion and an inner annular step portion of the metallic container of the battery. A lead wire extends from one polarity electrode of the battery element and is connected to a central portion of the metallic plate.

3 Claims, 1 Drawing Figure

U.S. Patent
Jun. 10, 1980
4,207,385
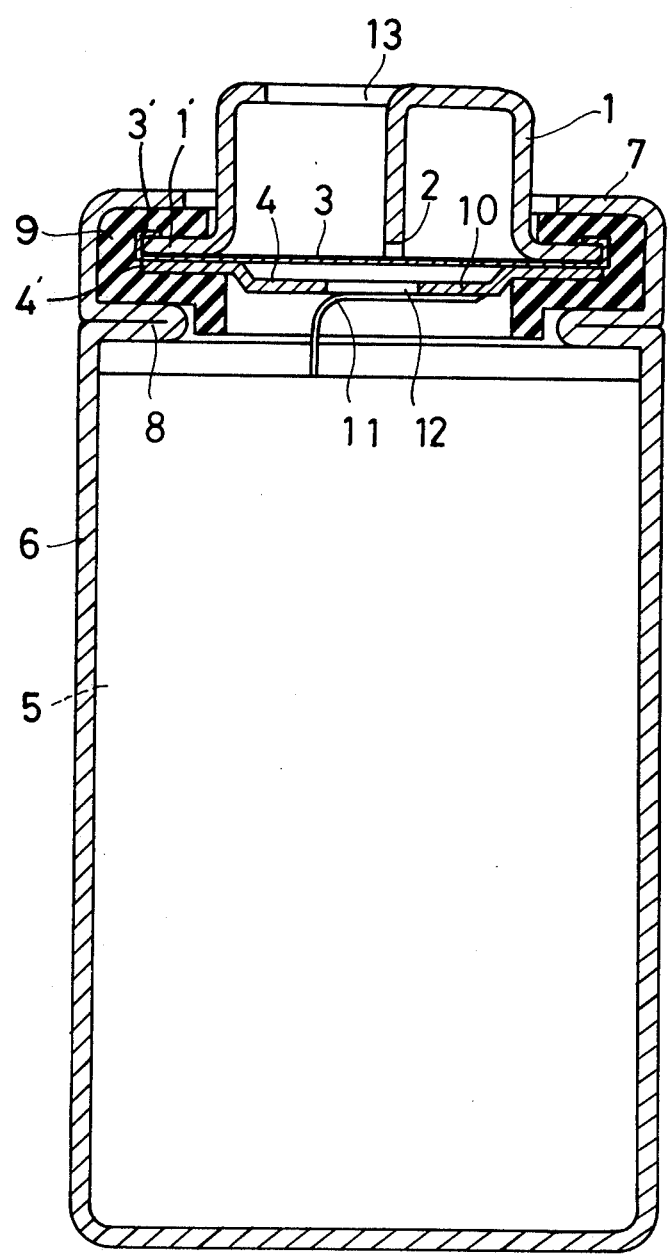

CLOSED TYPE ALKALINE STORAGE BATTERY

BACKGROUND OF INVENTION

This invention relates to a closed type alkaline storage battery having a diaphragm type safety valve that has a hat-shaped terminal closure with a piercing needle and a diaphragm positioned below the piercing needle. The needle is fixed by caulking, to the peripheral edge of the closure, and gas pressure in the storage battery is extraodinarily heightened, the diaphragm is punctured by the piercing needle and the inner gas of the storage battery is discharged to the external open air.

In this kind of storage battery, utilizing the hat-shaped closure as a terminal, there has hitherto been adopted either, an arrangement where a leading wire extends from one polarity electrode of a battery element and comprises a set of anode and cathode electrode plates contained in a container. The wire is led out to the exterior by being passed through the inside of the caulked portion of the closure and the outer end thereof and is connected to the outside surface of the closure.

In an alternative arrangement the leading wire is connected by spot welding or the like through the diaphragm to the inside surface of the closure. Consequently, in the former case, it is defective in that sufficient airtightness by the caulking cannot be obtained along and around the passing portion of the leading wire passing through the caulked portion. As a result, a battery is produced which is insufficient in airtightness. In the latter case, it is defective similar to the above case where a portion insufficient in airtightness results along and around the leading wire because the leading wire connected to the inside of the closure is positioned in the caulked portion. These defects cannot be avoided especially when the storage battery is small in size.

SUMMARY OF THE INVENTION

This invention has for its object to provide a closed type alkaline storage battery which is free from the foregoing defects.

The principal features of the invention relate to an improved battery with favorable airtight properties, whereby, a metallic hat-shaped terminal closure has a piercing needle, a puncturable metallic diaphragm is positioned below the piercing needle and fixed, by caulking, at its peripheral edge portion to a peripheral edge of the closure a comparatively thick and hard subsidiary metal plate is simply placed on the inner surface of the diaphragm and applied to an open portion of a tubular metallic container containing a battery element and peripheral edge portions of the closure, the diaphragm and the subsidiary metal plate are clumped in airtight relation through a packing between a caulked end portion and an inner annular step portion of the metallic container and a leading wire extending from one polarity electrode of the battery element is connected to a central portion of the subsidiary metal plate 4.

Other objects and advantages of the present invention will be better understood with respect to the accompanying specification, claims and drawing.

IN THE DRAWING

The single FIGURE of the drawing is a sectional side view of the invention.

DESCRIPTION OF THE INVENTION

Referring to the drawing, numeral 1 denotes a metallic hat-shaped terminal closure, and the same is provided at its central portion with a piercing needle 2 projecting vertically downward. A metallic diaphragm 3 which is 0.08 mm in thickness and can be punctured by the piercing needle 2, and is positioned below the piercing needle 2. It is fixed, by caulking, at its peripheral edge portion 3' to a peripheral edge portion 1' of the closure 1. A comparatively thick and hard subsidiary metal plate 4 of 0.3 mm in thickness is formed into a dish-shaped bent plate having at its intermediate portion an offsetted portion; and a peripheral edge portion 4' is simply placed on the diaphragm 3. Due to the provision of the offset portion at the intermediate portion of the subsidiary metal plate 4, the plate 4 is increased in strength and the central portion is apart from the diaphragm 3 and good operation of the diaphragm 3 can be secured.

The closure 1, the diaphragm 3 and the subsidiary metal plate 4 are applied to cover an open portion of a tubular metallic container 6, contains a battery element 5, and peripheral edge portions 1', 3', 4' of the closure 1. The disphragm 3 and the subsidiary metal plate 4 are fixed, by caulking, through a packing 9 between a caulked end portion 7 and an inner annular step portion 8 of the metallic container 6. A leading wire 11 extending from one polarity electrode of the battery element 5 is connected by spot welding to the rear surface of a central portion 10 of the subsidiary metal plate 4.

It is important that the subsidiary metal plate 4 is simply placed on the inner surface of the diaphragm 3 without caulking the periphery edge portion 4' thereof so as to embrace and hold the peripheral edge portion 1' of the closure 1. This is for the reason that subsidiary metal plate 4 is required to be comparatively thick and hard so that welding of the leading wire thereto is possible. If such a thich and hard plate 4 is fixed by caulking at its peripheral edge portion together with the peripheral edge portion of diaphragm to the periphery edge portion of the closure, the caulked portion thereof is caused to have waves or wrinkles. Insufficiency of airtightness due to the waves or wrinkles results, and in addition for preventing insufficiency of airtightness, the diaphragm and the metal plate are required to be caulked one by one through respective processes, and thus the number of process steps is increased and the work becomes difficult.

Referring to the drawing, numeral 12 denotes an opening made in the subsidiary metal plate 4, and numeral 13 denotes a vent opening made in the closure 1.

Thus, according to the invention, the subsidiary metal plate 4 is simply placed on the inner surface of the diaphragm 5, and the leading wire 11 extending from one polarity electrode of the battery element 5 is connected to the central portion 10 of the subsidiary metal plate 11. Therefore, there is no interposition of the leading wire 11 in the caulked portion between the closure 1 and the container 6, and thus a uniform airtight sealing condition throughout the whole annular portion of the battery can be obtained by simply and more excellent sealing properties than that of the conventional closed type storage battery of this kind can be obtained, and even a small-sized tubular closed type storage battery can be simply obtained.

PREFERRED MODE

A closed type alkaline storage battery characterized in that a metallic hat-shaped terminal closure 1 having a piercing needle 2, a puncutrable metallic diaphragm 3 positioned below the piercing needle 2 and fixed, by caulking, at its peripheral edge portion 3' to a peripheral edge of the closure 1, and a comparatively thick and hard subsidiary metal plate 4 simply placed on the inner surface of the diaphragm 3 are applied to an open portion of a tubular metallic container 6 containing therein a battery element 5, and peripheral edge portions 1', 3', 4' of the closure 1, the diaphragm 3 and the subsidiary metal plate 4 are clamped airtight through a packing 9 between a caulked end portion 7 and an inner annular step portion 8 of the metallic container 6, and a leading wire 11 extending from one polarity electrode of the battery element 5 is connected to a central portion 10 of the subsidiary metal plate 4.

Many modifications and variations of the present invention are possible in light of the above teachings. It is, therefore, to be understood that within the scope of the appended claims, the invention may be practiced otherwise than as particularly described.

What is claimed is:

1. A closed typed alkaline storage battery comprising a metallic hat-shaped terminal closure having a piercing needle; a puncturable metallic diaphragm positioned below the piercing needle and fixed by caulking at its peripheral edge portion to a peripheral edge of the closure; a comparative thick and hard subsidiary metal plate placed at its peripheral edge portion on the inner surface of the peripheral edge portion of the diaphragm, both the peripheral edge portion being not welded together; the subsidiary metal plate having an open portion and being a dish-shaped bent plate having at its intermediate portion an offset circular portion, so that a central portion of the subsidiary metal plate is spaced from a central portion of the diaphragm; the metallic hat-shaped terminal closure, the puncturable metallic diaphragm and the subsidiary metal plate which are put one upon another being applied through an annular packing to an open portion of a tubular metallic container containing therein a battery element; the three peripheral edge portions of the closure, the diaphragm and the subsidiary metal plate being clamped in airtight relation through the packing between a caulked end portion and an inner step portion of the metallic container; and a leading wire extending from one polarity electrode of the battery element and connected to a central portion of the subsidiary metal plate.

2. A closed type alkaline storage battery as claimed in claim 1, wherein: the diaphragm 3 is about 0.08 mm in thickness.

3. A closed type alkaline storage battery as claimed in claim 1, wherein: the subsidiary metal plate 4 is about 0.3 mm in thickness.

* * * * *